United States Patent [19]

Chimienti et al.

[11] 4,417,302
[45] Nov. 22, 1983

[54] BYPASS FOR PRIORITIZING INTERRUPTS AMONG MICROPROCESSORS

[75] Inventors: Domenico Chimienti, Vanzago; Arturo Vercesi, Rho, both of Italy

[73] Assignee: Honeywell Information Systems Inc., Waltham, Mass.

[21] Appl. No.: 182,163

[22] Filed: Aug. 28, 1980

[30] Foreign Application Priority Data

Aug. 30, 1979 [IT] Italy ............... 25356 A/79

[51] Int. Cl.³ .............. G06F 15/16; G06F 15/40; G06F 9/22
[52] U.S. Cl. .................................................. 364/200
[58] Field of Search ... 364/200 MS File, 900 MS File; 340/825.5, 825.51, 825.86, 825.87

[56] References Cited

U.S. PATENT DOCUMENTS

| | | | |
|---|---|---|---|
| 3,800,287 | 3/1974 | Albright | 364/200 |
| 3,832,692 | 8/1974 | Henzel | 364/200 |
| 3,866,181 | 2/1975 | Gayman | 364/200 |
| 4,106,104 | 8/1978 | Nitta | 364/900 |
| 4,123,794 | 10/1978 | Matsumoto | 364/200 |

OTHER PUBLICATIONS

Electronik, vol. 28, No. 15, Jul. 1979, pp. 66–69–German Publication–Hillers et al.
Strietelmeier–*Arbitration Array for Device Connection to I/O Channels*–IBM TDB–vol. 22, No. 12, May 1980, pp. 5237–5238.
R. Jaswa–*Designing Interrupt Structures for Multiprocessor Systems*, Compute Design, vol. 7, No. 9, Sep. 1978, pp. 101–110.

*Primary Examiner*—Harvey E. Springborn
*Attorney, Agent, or Firm*—George Grayson; Nicholas Prasinos

[57] ABSTRACT

A system comprising several peripheral microprocessors are connected to a central processor through a common bus. Each processor may access the bus using an interrupt signal. In order to avoid conflicts among processors in accessing the bus, processors are designated with decreasing priority. A processor which accesses the bus by using said interrupt signal generates at the same time an inhibit signal which prevents processors having a lower priority from emitting a said interrupt signal. In order to reduce the propagation time, a bypass network for the inhibit signal is associated with each processor and a propagation path is provided for the inhibit signal in the form of a matrix.

1 Claim, 5 Drawing Figures

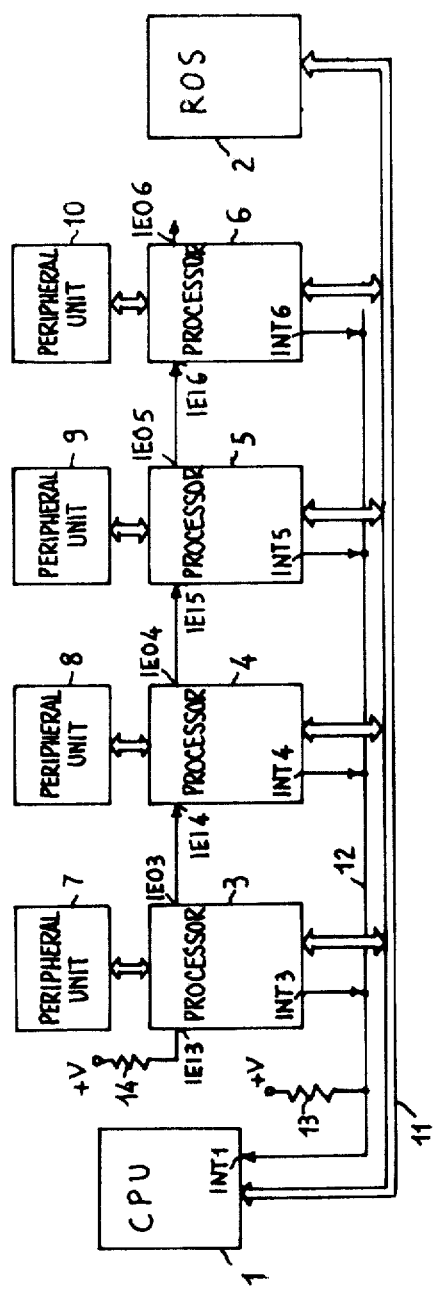
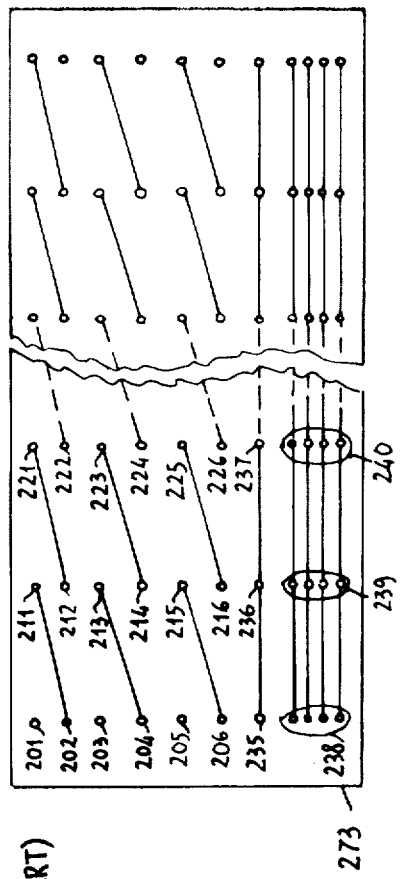
FIG. 1 (PRIOR ART)
FIG. 5

BYPASS FOR PRIORITIZING INTERRUPTS AMONG MICROPROCESSORS

BACKGROUND OF THE INVENTION

1. Field of the Invention

The present invention relates to the architecture of data processing systems which make use of microprocessors intercommunicating by means of a common system channel or BUS. More particularly, it relates to the priority mechanism which allows the common use of the BUS among the several microprocessors.

2. Description of Prior Art

Large Scale Integration (LSI) or microprocessor components are being used more and more in computer and data processing systems. Such components are widely utilized to perform the functions of central processing units or interface control units which are connected to the peripheral devices.

An example of such integrated components or microprocessors is the Z-80 ZILOG Trademark microprocessors family of the ZILOG Corporation. Such family includes, for example, a microprocessor identified as Z-80 CPU central processing units which performs the specific functions of a central control unit in a data processing system, and a miroprocessor identified as Z-80 PIO (Parallel Input/Output microprocessor) which performs interface control functions in connecting peripheral devices through parallel channels to the systems. Another microprocessor of the family identified as Z-80 SIO (Serial Input/Output microprocessor) performs an interface control function in connecting peripheral devices through a serial channel to the system. These interface microprocessors such as Z-80 PIO and Z-80 SIO will be referred to herein as "processors".

A simple system built up with such family components may include, for example, a central unit Z-80 CPU, an oscillator for the generation of timing signals, a power supply for the generation of a +5 V regulated voltage, a read only memory for containing the microprograms required for the operation of the system and a processor Z-80 PIO (or SIO) coupled to an input/output peripheral unit such as a keyboard/printer. More complex systems may include, in addition to the read only memory, one or more read/write working memories for storage of data and programs, and a plurality of processors such as Z-80 PIO (or SIO) each connected to the common system BUS.

This kind of architecture makes possible the assembling of flexible systems, based on modular elements which can be added or removed according to need, to obtain the most suitable configuration for the required functions.

For example a system can be materially built up as a chassis or rack where a number N of printed circuit boards can be housed. The rack is provided with a plurality N of connector sockets for such printed circuit boards. The corresponding contact elements of each connector socket are all connected together by means of "wire-wrap" technology or preferably by means of conductive leads formed on a printed circuit board. This board is usually called the "back panel". These parallel connection leads materially form the system BUS.

A printed circuit board can include the microprocessor Z-80 CPU, the oscillator and other possible circuits. A second board can include a control Read Only Storage (ROS) memory. One or several additional boards can include a read/write working memory, one or several interface processors each, or whatever else is required. In such a structure it is possible to reconfigure the system by adding or taking away boards within the capacity N of the rack to house such boards. Thus a single product design satisfies the needs of several users or the different needs of the same user.

Unfortunately a system reshaping and expansion which can be obtained by the simple adding or changing of printed circuit boards has some limitations at the present state of the art. These limitations are substantially imposed by the competing requests of several processors for access to a common BUS or CPU control unit. Each processor can send an interrupt request signal to the CPU central unit through a lead specifically assigned to each processor. The plurality of such leads for each processor is connected to the input of a network which detects interruptions and selects one of them on a priority basis. Such network acts as intermediary between the several "processors" and the central unit CPU, presenting to the central unit only one interruption at a time and selecting the highest priority processor.

The selection operation requires a group of leads, each one dedicated to a processor; that is, it connects the selection network to a processor. In order to have a system which can be reshaped, a prearranged recognition and selection network suitable for the maximum number of processors that the system architecture contains is required, and therefore a great waste of components is generally involved. The prior art selection means makes use of a high number of interconnection leads equal to twice the maximum number of processors that the system may contain.

In recent system architectures, these problems are avoided by providing a selection network which only utilizes one interruption lead for all interruption request signals. Also in order to execute a prioritary selection, each processor is furnished with an internal masking mechanism. This mechanism allows the inhibition or masking of the interruption request generated from each processor, if such processor detects the presence of a higher priority interruption request. The priority of each processor is determined by its position in an inhibition chain.

Each processor has an interruption enabling input (IEI) and an interruption enabling output (IEO). By coupling the output IEO of each processor with the input IEI of another processor, a chain is formed in which an orderly priority is awarded to the several processors.

The identification of the interrupting processor occurs through the sending on the BUS lead of an "interrupt vector" which supplies directly or indirectly the identity of the interrupting processor. It is possible to extend and reshape the system utilizing the invention without the need to prearrange a plurality of interruption handling leads and a suitable priority newtwork. Nevertheless the interruption masking mechanism requires the transfer of a signal in the chain of processors with a propagation time from processor to processor in the order of 200 nanoseconds and strictly limits the number of processors which can be effectively connected to the BUS.

SUMMARY OF THE INVENTION

These limitations are overcome by the bypass for prioritizing interrupts among processors which is the object of the present invention.

The BUS modular architecture of the invention makes use of simple additional circuits for the realization of an interruption masking network. Such masking network, which is identical on each printed circuit board, is intrinsically very fast and provides a matrix connection network instead of a cascade connection. In this way the number of processors which can be connected to the BUS is unlimited without causing unacceptable operational delays. In addition, the need of any specialization of the back panel or of any additional electrical connections is obviated. Moreover, it allows for the assembly of several processors on the same board while still maintaining a good flexibility in the assignment of the relative priorities among such processors.

BRIEF DESCRIPTION OF THE DRAWINGS

These and other features will appear more clearly from the following description of a preferred embodiment of the invention and from the attached drawings where:

FIG. 1 shows in block diagram the architecture of a prior art system utilizing a chain interrupting mechanism;

FIG. 5 shows the connection back panel of the embodiment of FIG. 4.

DESCRIPTION OF THE PREFERRED EMBODIMENT

Figure 2:
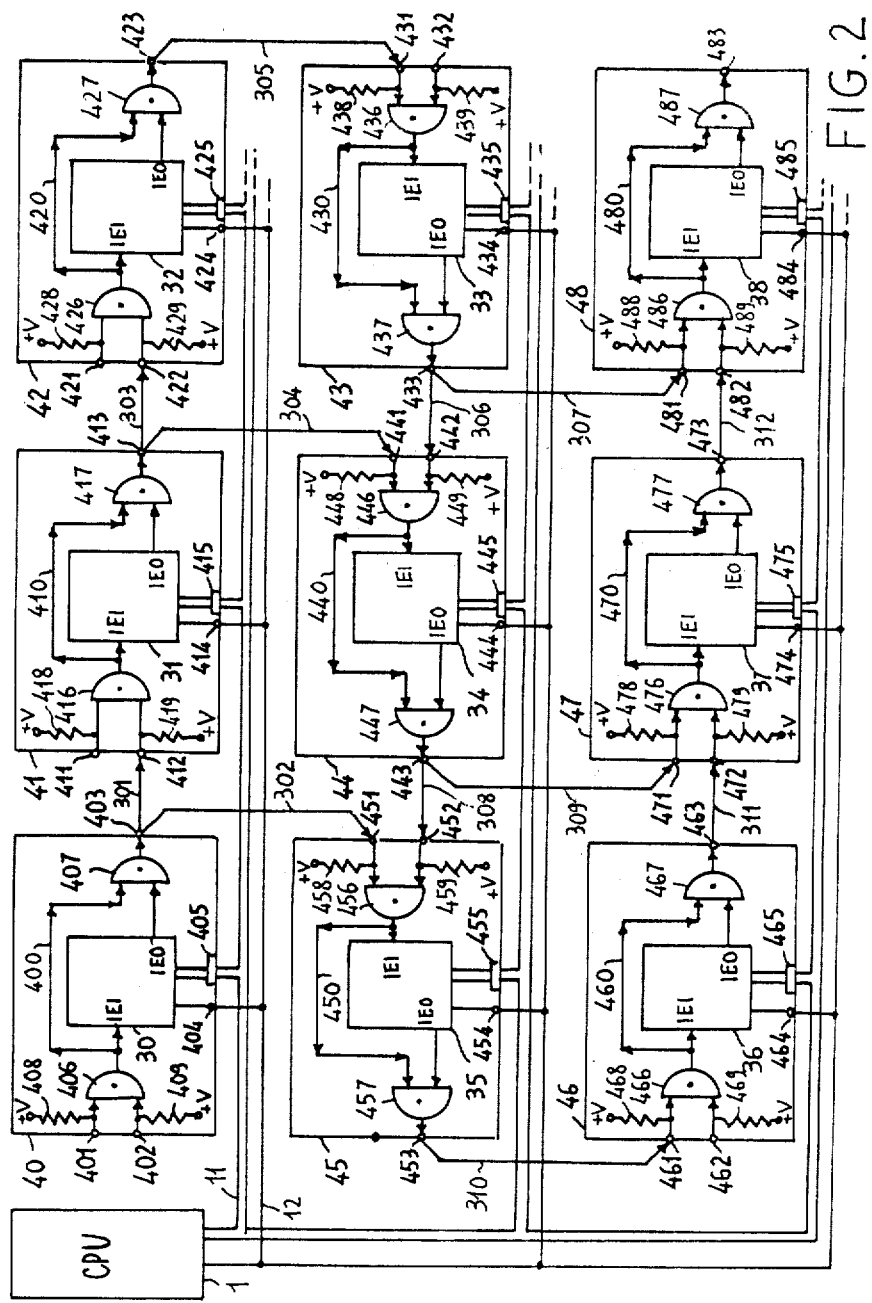
FIG. 2 shows in block diagram a preferred embodiment of the present invention.

FIG. 1 represents in block diagram a prior art system architecture which uses a chain interrupting mechanism.

The construction of such microprocessor system, the operations carried out, and the dialogues developed on the common BUS are not given, because it is unnecessary for an understanding of the present invention. In FIG. 1 the system includes a central processing unit (CPU) 1, a microprogram memory or ROS 2 and a certain number of processors 3, 4, 5, 6 each connecting to one of a group of processor units 7, 8, 9, 10. The CPU, processor units and ROS memory are coupled to an information transfer common channel or BUS 11 having leads for the transfer of data, communications, signals, and addresses. Access to the BUS is managed and controlled by the CPU 1, which can issue commands or authorization signals to the several processors to use the BUS leads and to apply thereon electrical signals representative of information. While the memory 2 is a passive element, the processors can interrupt to access the BUS 11 on their own initiative for certain reasons.

All the processors are provided with outputs INT 3, INT 4, INT 5, INT 6 respectively connected to a common lead 12, which in turn is connected to an input INT 1 of CPU 1. Lead 12 is normally maintained at a positive electrical level by a pull up resistor 13, connected to a +V voltage source. When a processor wants to send an interruption request to CPU 1, it grounds its output INT and the electrical level on lead 12 falls to 0. Such electrical level variation at suitable times through input INT 1 is detected by CPU 1 and after a time interval the CPU 1 send BUS 11 an interruption acceptance. For example in the ZILOG microprocessor family above-mentioned, this information is provided by the contemporaneous presence of two signals on two leads named M2 and IORQ, which are part of the BUS. With such architecture, several processors can concurrently ground their output INT 1 and CPU 1 is unable to handle this situation. Furthermore, an interruption acceptance sent on the BUS must be identified by one processor at a time. For such purpose, each processor is provided with an internal interruption logic, with input terminals IEI 3, IEI 4, IEI 5, IEI 6 respectively and with output terminals IEO 3, IEO 4, IEO 5, IEO 6 respectively. Each processor can effectively forward an interruption only if a positive electrical signal is present on its input IEI: otherwise the sending of interruptions is inhibited. If an interrupt signal has already been forwarded, the interrupt signal is masked; that is, the output INT is disconnected from ground. Also each processor normally keeps its output IEO at positive electrical level and lowers it to electrical/logical level 0 when it produces an interruption or when its input IEI is lowered to 0.

Further each processor is able to identify an interruption accepting signal only if it has sent an interruption and this is not masked. It is therefore clear that by connecting the output IEO 3 to input IEI 4 and the output IEO 5 to input IEI 6, a chain is formed which assigns to the several processors a prearranged priority. Obviously the input IEI 3 of the first processor of the chain will permanently be held at a positive level, for instance, by means of a connection with a voltage source +V through a resistor 14. Therefore if the first processor 3 produces an interruption signal, the output IEO 3 falls to 0 and the same occurs in the cascaded chain of the inputs IEI and the output IEO of the processors 4, 5, 6. None of these processors can, therefore, forward interruptions until the first processor has set again its IEO and INT outputs at level 1.

However, such inhibition mechanism does not prevent several processors forwarding concurrently an interruption to CPU 1. The propagation speed of the electrical signals in the circuits has a limit. In each processor the time required by the transition from 1 to 0 at the IEI input to propagate and appear as a transition from 1 to 0 at the IEO output is approximately 200 nanoseconds. Therefore the masking effect of an interrupting cascaded processor spreads to the lower priority processors with a cumulative delay. In such time interval it is possible that several processors present at the same time an interruption request. For this reason the CPU has to wait before taking into account a pending interruption in order to be sure that such interruption is due to one and only one processor at each time and that its interruption acceptance is recognized by the interrupting processor only. When the interruption processor recognizes that an interruption acceptance answer has been sent to it, it puts on the BUS leads information which specifies its name or the initial address of an interrupt handling program, or other information used by CPU 1. However, such chain interrupting mechanism has the disadvantage of requiring a certain dead time between the instant in which an interruption is generated and the instant in which it is completed. Such dead time is prejudicial to the timely interrupt realization of systems including processors which control fast processor units. For instance a system using the described interruption mechanism has a propagation time of the inhibition signal of 200 nanoseconds; therefore a system including 16 processors has a time interval of about 3.2 microseconds between the instant in which the interruption is generated and completed. Such delay time is not acceptable. It is also evident that more complex systems require a longer and less acceptable dead time.

The present invention overcomes this limitation by using a network which speeds up the propagation time of the inhibition signal from the input IEI to output IEO of each processor and eliminates the chain interrupting mechanism. The network interrupting mechanism of the present invention reduces the number of steps which the inhibition signal performs for reaching from the output IEO of a generating processor to the input IEI of the other processors.

FIG. 2 shows a preferred embodiment of the invention with reference to a system comprising 9 interrupting processors 30 to 38, respectively. Each processor is mounted on printed circuit boards 40 to 48 and each board can include auxiliary circuits, not shown, and interface circuits for coupling with peripheral devices or transmission lines. Each circuit board is connected with a plug for insertion in an interconnection socket mounted on the back panel of a rack.

As shown in FIG. 2 the connection edge of each board includes a suitable number of input and output pins which are located on different sides of each board. In detail, with reference to board 40, the connection edge has: two input pins 401, 402 for receiving two input enabling/inhibiting signals IEI1, IEI2; an output pin 403 for issuing an output enabling/inhibiting signal IEO; an output pin 404 for issuing an interruption signal INT; and an input/output pin set 405 for the interconnection of processor 30 with BUS leads 11. Note that the references of the several pins are formed by adding a cipher to the board reference number.

As can be seen from FIG. 2, all the other boards 41 to 48 are identical to board 40 and are provided with as many identical and functionally equivalent input/output pins as board 40. Such pins are therefore identified by numeric references formed by adding to the number of the board to which they belong the reference cipher used for the corresponding pins of board 40.

It is a feature of this invention that each board is provided with a network for speeding up the masking operation. With reference to board 40, the network includes two AND gates 406, 407 with two inputs. The first AND gate 406 has its output connected to the input IEI of processor 30 and its two inputs connected to pins 401, 402 respectively of the board. The two inputs are normally held at a voltage level +V through two resistors 408, 409 of suitable value, connected between such inputs and a voltage source +V.

The second "open collector" type AND gate 407 has its output connected to pin 403, a first input directly connected to the IEO output of processor 30, and the second input connected through lead 400 to the output of AND gate 406. Such network is identically repeated on each board.

The interconnections among the several boards are now considered. Pin 404 is connected for the transfer of the interrupt signal to BUS lead 12. Pins 405 are connected to the remaining BUS leads 11. Likewise pins 414 through 484 of the several boards are all connected to BUS lead 12 and pins 415 through 485 of the several boards are all connected to the remaining BUS leads 11. Such leads or connection elements are formed on the back panel.

Figure 3:
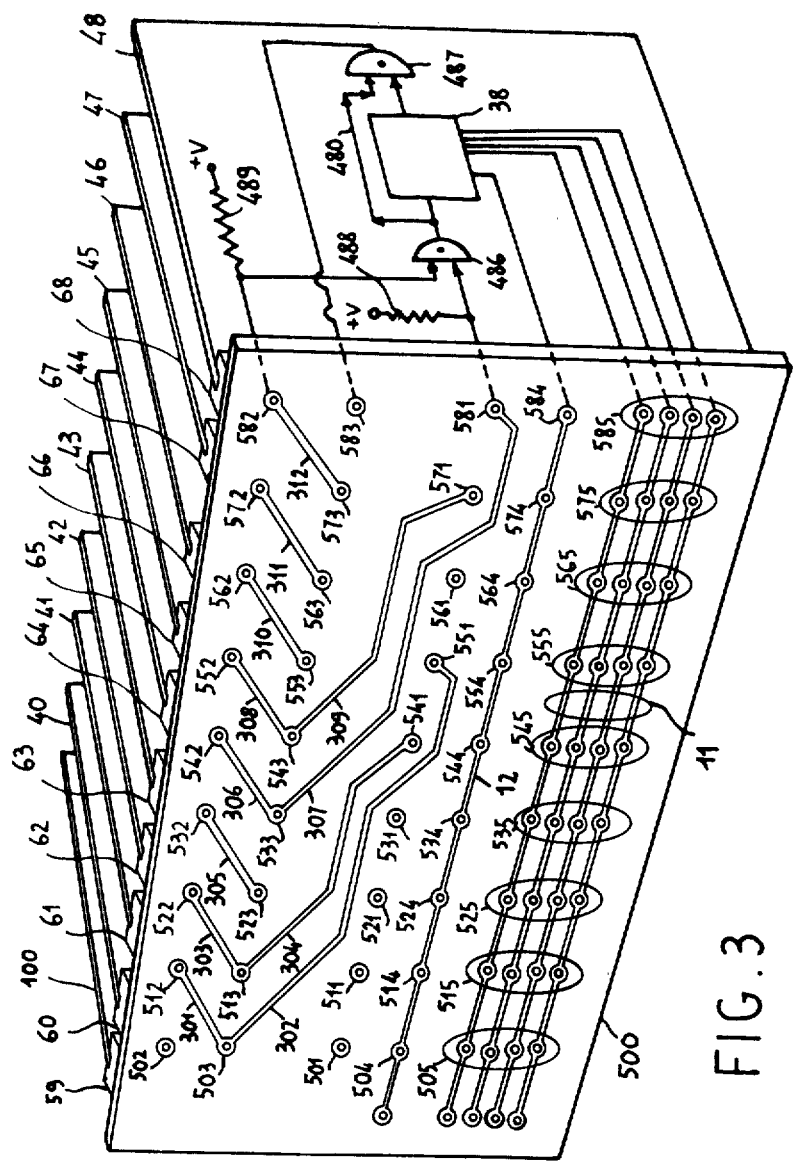
FIG. 3 is a perspective view of the mechanical structure according to the embodiment shown in FIG. 2.

According to another feature of the invention the criterion for connection of the input pins 401 through 481, 402 through 482, and the output pins 403 through 483 of each board is as follows. The nine processors 30 through 38 and the corresponding boards 40 through 48, to which an interrupting power with decreasing priority from processor 30 to processor 38 is ascribed, are logically organized in a matrix of 3 lines and 3 columns. Such logic organization does not necessarily coincide with a topographic arrangement of the same kind; in fact, FIG. 3 shows that the several boards can be arranged in a single pile. The matrix of FIG. 2 includes a first line formed by boards 40, 41, 42, a second line formed by boards 45, 44, 43 and a third line formed by boards 46, 47, 48. The output pin 403 of board 40 is connected through connection 301 to pin 412 of board 41. It is further connected through connection 302 to pin 451 of board 45. The output pin 413 of board 41 is connected through connection 303 to pin 422 of board 42. It is further connected through connection 304 to pin 441 of board 44. The output pin 423 of board 42 is connected through connection 305 to pin 431 of board 43. The output pin 433 of board 43 is connected through connection 306 to pin 442 of board 44. It is further connected through connection 307 to pin 481 of board 48. The output pin 443 of board 44 is connected through connection 308 to pin 452 of board 45. It is further connected through connection 309 to pin 471 of board 47. The output pin 453 of board 45 is connected through connection 310 to pin 461 of board 46. The output pin 463 of board 46 is connected through connection 311 to pin 472 of board 47. The output pin 473 of board 47 connected to pin 482 of board 48 through connection 312. All these connections are formed on the back panel.

It should be noted that such connections are developed according to a network of lines and columns and provide a path for the interrupt enable/inhibit signal which extends through the boards both in lines and columns. Generally a system formed by MxN processors (each one mounted on a board) and organized according to a matrix M lines and N columns may be considered.

The peripherals are arranged in the matrix with a descending priority by line order, a descending priority by column order for odd lines, and increasing priority by column order for even lines. In other words, the system may be thought as a string of MxN peripherals of decreasing priority, which string is logically fan-folded to form a matrix of M lines and N columns.

If the board including the processor corresponding to line i and column j is indicated by Pij, the board Pij output pin which is used to transfer the interrupt enable/inhibit signal is indicated by Uij (this is the pin corresponding to pins 403 through 483 of FIG. 2). If the two input pins of board Pij, which receive the interrupt enable/inhibit signal are indicated by I1ij and I2ij, then the interconnection among the boards connects the output pin Uij with the input pins I1i+1,j and I2i,j+1 with the following conditions:

$1 \leq i \leq M$ $1 \leq j \leq N$ $i + 1 \leq M$ $1 \leq j \pm 1 \leq N$ where sign + is used when i odd and sign − is used with i even.

It is now possible to clearly show how, through the speed-up network arranged on each board and the matrix interconnection system, the interrupt inhibition and masking signal spreads among the boards with a masking time which is substantially lower than the one obtained with the prior art arrangements. Still considering FIG. 2 and particularly board 40, an interrupt/inhibition signal at logic level 0 applied to input 401, 402 spreads to input IEI of processor 30 with a propagation time determined by AND gate 406. Such time in the case of TTL technology is about 10 nanoseconds. From here the signal spreads through connection 400 and AND gate 407 to output 403 with a further delay of about 10 nanoseconds. The total propagation delay of a signal at logic level 0 from inputs 401, 402 to output 403 is therefore about 20 nanoseconds. Lacking such speed-up network and supposing that inputs 401, 402 are directly connected to the input IEI of processor 30 and the output IEO of processor 30 is directly connected to output 403, the propagation time would be typically in the order of hundreds nanoseconds. By such arrangement a remarkable reduction is therefore obtained in the propagation time of the signal from the input to the output of the board and this is true for all the boards.

The whole system of processors is now considered. The connections between the several boards form a system of processors with decreasing priority from 30 to 38; that is, a system of boards with decreasing priority from 40 to 48.

If processor 30 generates an interruption signal, it lowers at the same time its output IEO to logic level 0 and such level spreads to pin 403 and then through pin 412 and AND gate 416 to processor 31, inhibiting or masking a possible interrupt request from processor 31. Further through the speed-up network of board 41, the signal spreads to board 42 inhibiting or masking processor 32, and so on up to board 48. However if processor 30 generates an inhibit signal to IEO output, such signal is transferred to processor 35 of the same column through connections 302 as well as through the speed-up network of board 45 and also to processor 36 of the same column. Thus the inhibit/interrupt signal spreads through processors in cascade, not only according to a line order, but also according to a column order. This is obviously valid for all the processors of the system.

Using such a connection system the worst cause propagation time of an inhibit signal from the highest priority board to the one with lowest priority is given by:

$$Tp = \Delta \times (M + N - 2)$$

with
 $\Delta$ = propagation time of a board
 M = number of lines
 N = number of columns.
With reference to FIG. 2, such time is therefore:

$$Tp = \Delta \times (3 + 3 - 2) = 4 \times \Delta$$

In case of a simple series connection of the boards and corresponding processors, it would be:

$$Tp = \Delta \times (M \times N - 2) = \Delta \times (3 \times 3 - 2) = 7 \times \Delta$$

The propagation time reduction becomes still more relevant in systems of more lines and columns. For instance, in a system formed by 25 processors arranged in a 5 line and 5 column matrix, the worst propagation time is:

$$Tp = 8\Delta$$

while in the case of a simple series connection, the time would be:

$$Tp = 23\Delta$$

The propagation time is therefore reduced almost to a third.

Further in FIG. 2 other important aspects of the described embodiment of the invention may be seen. First, it should be noted that some inputs such as 401, 402, 411 of boards 40, 41, 42 are not used, and therefore the speed-up networks of such boards could be simplified with a corresponding saving in electronic components. It is, however, preferable that the boards have identical speed-up networks because it allows their complete position interchangeability within the matrix. In this way it is possible to change, according to the user needs, the relative priority among the several processors.

Secondly, the central unit CPU 1 is mounted on a board identical as to size and connection pins to the processor boards and can be located in the matrix in place of the higher priority processor 30 shown in FIG. 2. Also using such a speed-up network, the CPU 1 can be placed anywhere in the matrix in place of any processor with lower priority. Simplification is obviously accomplished in such a case since the network function is only to establish a connection between two input pins of the board and an output pin; and the same is true for any possible memory module.

Thirdly, once provided a mechanical architecture and a back panel circuit arranged to fit with a MxN board number, it is not required that the system actually includes MxN boards; on the contrary, it can include a lower number of them.

FIG. 3 shows the mechanical architecture according to the embodiment of FIG. 2. Accordingly as needed, a printed circuit board, which may be a single, double or multilayer, provides a back panel 500. Ten connection sockets 59 through 68 are mounted, for instance by welding, on board 500 in parallel stacked fashion, each one being intended to receive the edge of a printed circuit board where the connection pins are located. Board 100, containing CPU 1, is inserted into socket 59, board 40 into socket 60, board 41 into socket 61 and so on up to board 48. The socket conducting elements (not shown) are welded to back panel pads and establish an electrical connection between the pins of the boards 100, 40 through 48 and the pads. In detail the pins shown in FIG. 2 by 4ij (i=0, 1 ... 8; j=2, 2 ... 5) are connected with pads shown in FIG. 3 by 5ij (i=0, 1 .. . 8; j=1, 2 ... 5). Back panel 500 has several printed leads which form BUS 11, the interrupt leads 12, as well as the priority network leads 301 to 312 shown in FIG. 2. BUS 11 and lead 12 extend to socket 59 and are connected to the CPU board 100.

With such a back panel it is possible to set up systems containing in addition to the central unit CPU 1 a maximum of 9 processors. The only requirement for functionality of the priority network in the case of a system including less than 9 processors is the ordered arrangement of the system boards in the first interconnection sockets, from socket 59. The relative arrangement of the boards among themselves determines the priority of the processors mounted on each board. By simply changing the position of the boards the relative priority can be modified according to user needs.

Figure 4:
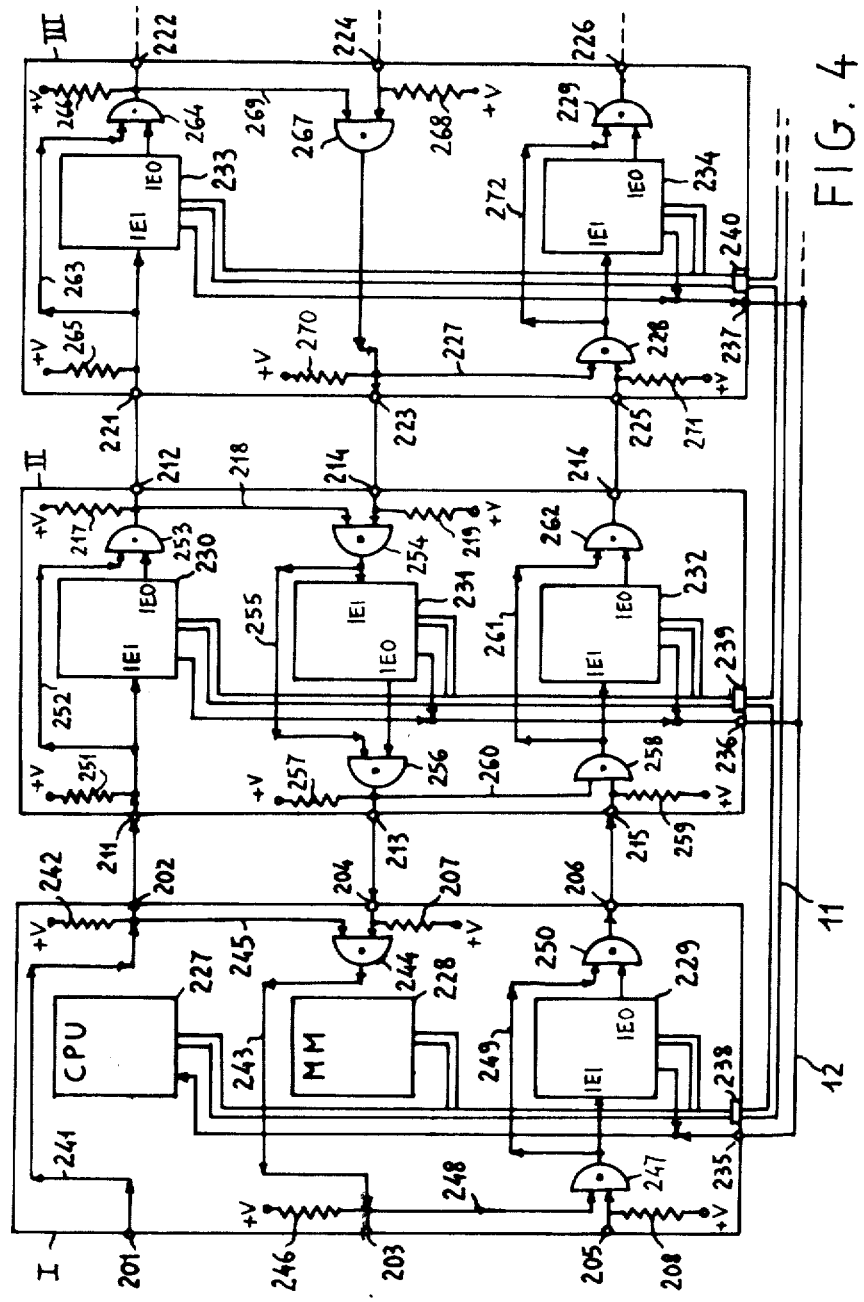
FIG. 4 shows a modification of the preferred embodiment shown in FIG. 2.

In the previous description reference has been made to systems where each board includes one processor only. However the priority awarding and the interrupt masking matrix system can be used in electronic data processing systems where a plurality of processors is mounted on a single board. In such a case, some interconnection leads, indicated in FIGS. 2 and 3 as formed on the back panel, can be directly made on the processor boards. FIG. 4 shows such embodiment.

In FIG. 4, three printed circuit boards I, II and III are shown. Board I includes a central unit CPU 227, a memory unit MM 228 and a processor 229; Board II includes three processors 230, 231, 232; and Board III includes two processors 233, 234. The boards are provided with the same number of input and output pins, identically located, to allow for position interchangeability. Thus each board has a pin 235, 236, 237 respectively for connection to BUS lead 12 dedicated to the transfer of the interrupt signal and a pin set 238, 239 240 respectively for the interconnection of the several processors and of the memory units or CPU with BUS leads 11. Also each board has a plurality of input pins 201, 204, 205 respectively for plate I; 211, 214, 215 for plate II and 221, 224, 225 for Plate III intended to receive input IEI enable/inhibit signals, as well as a plurality of output pins 202, 203, 206 respectively for plate I; 212, 213, 216 for plate II and 222, 223, 226 for plate III intended to transfer output IEO enable/inhibit signals. Such input and output pins for the transfer of signals IEI, IEO are suitably connected among themselves in order to form a matrix network for interruption transfer and masking.

Since the CPU does not intervene in the interruption generation and masking mechanism, pins 201 and 202 which relate to CPU 227 are directly connected together though lead 241 and normally held at a positive level though a "pull up" resistor 242. Since the memory does not operate in the interruption generation and masking mechanism, pins 203 and 204 which relate to memory 228 are connected together by lead 243 and through the two input AND gates 244 of the "open collector" type. An input of AND gate 244 is connected to pin 204; the second input is connected to pin 202 through lead 245. Pins 203 and 204 are normally held at positive level through "pull up" resistors 246 and 207 respectively.

Pins 205 and 206 are coupled to processor 229. Pin 205 is connected to one input of a two input AND gate 247, normally held at positive level by a "pull up" resistor, and to the second input to pin 203 through lead 248. The output of AND gate 247 is connected to input IEI of processor 229 and to one input of a two input "open collector" type AND gate 250 through a "bypass" lead 249 and to the second input to output IEO of processor 229. The output of AND gate 250 is connected to pin 206.

Considering plate II, pins 211 and 212 are coupled to processor 230. Pin 211 is connected to input IEI of processor 230 and through bypass lead 252 to one input of a two input "open collector" type AND gate 253. Pin 211 is normally held at a positive level by a "pull-up" resistor 251. The second input of AND gate 253 is connected to output IEO of processor 230. The output of AND gate 253 is connected to pin 212, normally held at positive level by "pull-up" resistor 217. Pins 213 and 214 are coupled to processor 231. Pin 214 is connected to one input of a two input AND gate 254, normally held at positive level by pull-up resistor 219. The second input of AND gate 254 is connected to the output of AND gate 253 through lead 218. The output of AND gate 254 is connected to input IEI of processor 231 and through lead 255 to one input of a two input AND gate 250 of the "open collector" type. The second input of AND gate 250 is connected to output IEO of processor 231. The output is connected to pin 213, normally held at positive level by pull-up resistor 257.

Pins 215 and 216 are coupled to processor 232. Pin 215 is connected to one input of a two input AND gate 258, normally held at positive level by the pull-up resistor 259. The second input of AND gate 258 is connected to pin 213 through lead 260. The AND gate 258 output is connected to IEI input of processor 232 and through lead 261 to one input of a two input AND gate 262. The second input of AND gate 262 is connected to output IEO of processor 232 and its output is connected to pin 216.

Considering board III, pins 221 and 222 are coupled to processor 233. Pin 221 is connected to input IEI of processor 233 and through lead 263 to one input of a two input AND gate 264. Pin 221 is normally held at positive level by a pull-up resistor 265. The second input of AND gate 264 is connected to output IEO of processor 233. The output of AND gate 264 is connected to tap 222 which is held at positive level by pull-up resistor 266.

Pins 233 and 224 are not coupled to any processor and are located on the board only to assure the identity among the several boards concerning the input and output terminals, and therefore their position interchangeability within the system architecture. Pins 223 and 224 are interconnected to each other by circuits which complete the network architecture of the circuits and of the interrupt and masking mechanism. Pin 224 is connected to one input of a two input AND gate 267, normally held at positive level by pull-up resistor 268. The second input of AND gate 287 is connected to pin 222 through lead 269. The AND gate 267 output is connected to pin 223, normally held at positive level by the pull-up resistor 270.

Pins 225 and 226 are coupled to processor 234. Pin 225 is connected to one input of a two input AND gate 228, and it is normally held at positive level by pull-up resistor 271. The second input of AND gate 228 is connected to pin 223 through lead 227. The AND gate 228 output is connected to input IEI of processor 234, and through lead 272, to an input of a two input open collector AND gate 229. The second input of AND gate 229 is connected to output IEO of processor 234 and its output is connected to pin 226.

The several boards are interconnected to each other through the leads of a back panel. Particularly the couples of pins 202 and 211, 204 and 213, 206 and 215, 212 and 221, 214 and 213, and 216 and 225 are connected to each other. The system architecture can be extended indefinitely by connecting pins 222, 224, 226 to corresponding pins of a fourth board and so on.

FIG. 5 shows the back panel 273 of a system as shown in FIG. 4. The reference numerals in FIG. 5 refer to the pins of the several boards which are connected through sockets (not shown) on the back panel. Also in FIGS. 4 and 5 it can be noted that a processing system is obtained, where the several processors are interconnected by an interrupt transfer and masking network of the matrix type which assigns a precise priority to the several processors, according to the relative position of the boards and the position of the processors within the boards. By changing the order of the boards it is possible to modify the relative priority both for groups of processors and for each single processor. The spread of the interruption masking signals occurs for lines and for columns of the matrix and through bypass circuits of each processor, which considerably reduces the signal propagation times.

For explanation purposes only, the Figures refer to the bypass network realized with AND type logic elements in conjunction with the enabling logic level 1 which has been considered. The use of different enabling levels for the two signals emitted by IEO outputs or received by IEI inputs causes obvious circuit modifications and can be replaced, for instance, by OR logical gates. Thus it is obvious that the description is directed to preferred embodiments of the invention and that many modifications may be made without departing from the scope of the invention.

What is claimed is:

1. A multiprocessor system including a central processor and a plurality of peripheral processors coupled to said central processor through a common bus, said central processor providing an interrupt servicing signal on said bus in response to an interrupt request signal generated by any one of said peripheral processors and received by said central processor through an interrupt line connecting said peripheral processors and said central processor, each of said peripheral processors having an input for receiving an interrupt enable signal and an output for delivering an interrupt enable signal, each peripheral processor being enabled to generate an interrupt request when receiving said interrupt enable signal on said input, each peripheral processor delivering said interrupt enable signal on said output when both receiving said interrupt enable signal on said first input and not generating said interrupt request signal, said multiprocessor system comprising further a bypass network for prioritizing interrupts among processors, said bypass network comprising:

a plurality of AND gating means, one for each peripheral processor, each one having a first and a second input and an output, said gating means output being connected to said input of the related peripheral processor; and a plurality of connections of said peripheral processor outputs with said first and said second inputs of said gating means, said peripheral processors being logically ordered in a matrix of M lines and N columns, with a descending priority by line order, the peripheral processors in the odd lines having a descending priority by column order and the peripheral processors in the even lines having an increasing priority by column order;

said plurality of connections connecting the output of each peripheral processor Pik of a line i and column k of said matrix, with said first input of the gating means related to the peripheral processor $Pi, K \pm 1$ of the same line, but of the contiguous $K+1$ column, if i is odd, $K-1$ column if i is even, and with said second input of the gating means related to the peripheral processor $Pi+1,k$ of the following line and column.

* * * * *

UNITED STATES PATENT AND TRADEMARK OFFICE
CERTIFICATE OF CORRECTION

PATENT NO. : 4,417,302
DATED : Nov. 22, 1983
INVENTOR(S) : Domenico Chimienti and Arturo Vercesi It is certified that error appears in the above-identified patent and that said Letters Patent are hereby corrected as shown below:

Title page:

Please change the Assignee from "Honeywell Information Systems Inc., Waltham, Mass." to --Honeywell Information Systems Italia, Milan, Italy--.

Signed and Sealed this

Twenty-fifth Day of December 1984

[SEAL]

Attest:

*Attesting Officer*

GERALD J. MOSSINGHOFF

*Commissioner of Patents and Trademarks*